United States Patent [19]

Madsen

[11] 4,365,177
[45] Dec. 21, 1982

[54] GAS-COOLED ROTOR FOR A TURBO-GENERATOR

[75] Inventor: Kristian D. Madsen, Västerås, Sweden

[73] Assignee: ASEA Aktiebolag, Västerås, Sweden

[21] Appl. No.: 244,575

[22] Filed: Mar. 17, 1981

[30] Foreign Application Priority Data

Apr. 2, 1980 [SE] Sweden .............................. 8002528

[51] Int. Cl.³ .............................................. H02K 1/32
[52] U.S. Cl. ...................................... 310/61; 310/45; 310/55; 310/65; 310/214; 310/215
[58] Field of Search ....................... 310/45, 52, 55–61, 310/64, 65, 214, 215, 261, 270

[56] References Cited

U.S. PATENT DOCUMENTS

| | | | |
|---|---|---|---|
| 2,702,870 | 2/1955 | Norris | 310/64 |
| 2,796,540 | 6/1957 | Barlow | 310/270 |
| 3,781,581 | 12/1973 | Lehven | 310/215 |
| 4,013,908 | 3/1977 | Weghaupt | 310/59 |
| 4,152,610 | 5/1979 | Wallenstein | 310/215 |

FOREIGN PATENT DOCUMENTS 2850388  5/1979  Fed. Rep. of Germany ...... 310/214

Primary Examiner—R. Skudy
Attorney, Agent, or Firm—Pollock, Vande Sande & Priddy

[57] ABSTRACT

Gas-cooled rotor for a turbo-generator with air gap pick up. Each rotor slot comprises a conductor bundle with a large number of tangentially extending cooling channels, which are connected to an inlet chamber (17) on one side of the conductor bundle and an outlet chamber (18) on the other side of the conductor bundle. The conductors of the conductor bundle are fixed with respect to each other by means of a plurality of radial rods (8) embedded into the conductor bundle, and a small, radially inner portion and a small, radially outer portion of the conductor bundle are fixed in the tangential direction by means of an inner (12) and an outer (10) spacing device, respectively. The slot wedge member is provided with a plurality of substantially evenly distributed inlet channels (19) and intermediate, substantially evenly distributed outlet channels (21). A plurality of inlet channels and a plurality of outlet channels are formed in a wedge portion which lies between two spacing bodies (10) located adjacent to each other in axial direction and belonging to the radially outer spacing device.

10 Claims, 10 Drawing Figures

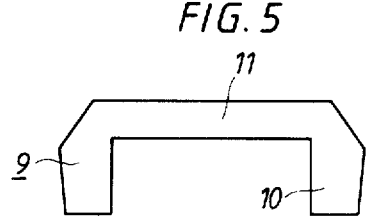
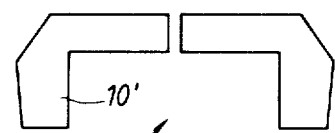
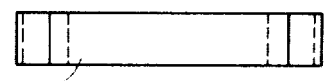
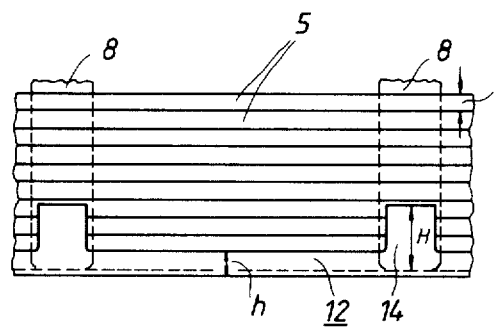
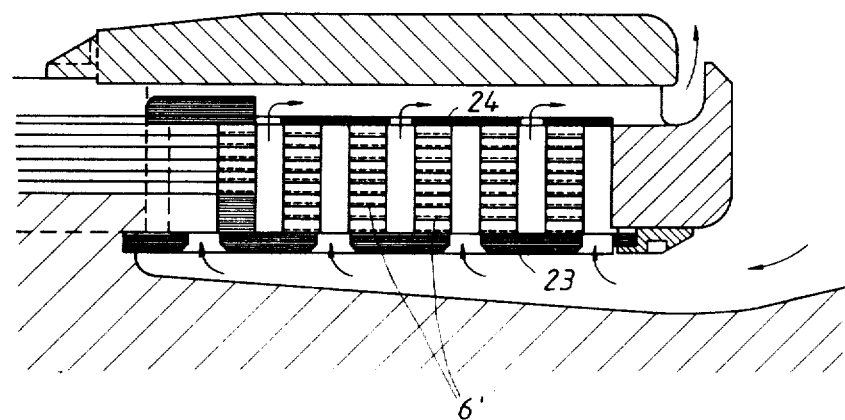

GAS-COOLED ROTOR FOR A TURBO-GENERATOR

The present invention relates to a gas-cooled rotor for a turbo-generator, comprising a plurality of winding slots and a rotor winding partially disposed in said winding slots, each winding slot containing a conductor bundle and a slot wedge device arranged to retain said conductor bundle in the winding slot, said conductor bundle being traversed by a plurality of substantially tangentially directed cooling channels, said slot wedge device being provided with a plurality of inlet channels and a plurality of outlet channels for cooling gas, said inlet channels communicating with said cooling channels at one side of said conductor bundle, said outlet channels communicating with said cooling channels at the other side of said conductor bundle, said inlet channels being each provided with an inlet opening which is disposed at the rotor periphery and directed in the direction of rotation, said outlet channels being evenly distributed among wedge portions located between the inlet channels, projections of said inlet channels in a radial plane crossing corresponding projections of said outlet channels, said conductor bundle being retained in tangential direction by means of a radially outer electrically insulating spacing device.

A rotor of this kind is disclosed in the Hungarian patent specification No. 148,228 and in U.S. Pat. No. 3,781,581.

Further, a machine designed according to the Hungarian patent specification is described in IEEE Transactions on Power Apparatus and Systems, Vol. PAS-98, No. 3, May/June 1979, pages 876–878.

With a rotor according to the invention, the intention is to achieve better cooling of the rotor winding, in comparison with known machines of the abovementioned type, with the same speed and the same rotor diameter.

In a rotor of the type described in the introduction, the pneumatic resistance for a flow of cooling gas flowing through a coil side—at the same total cooling channel volume—is extremely small in comparison with the corresponding resistance of rotors having axially extending cooling channels, since the total cross-sectional area of the tangentially extending cooling channels is to the corresponding surface of axial cooling channels as the side surface of the coil side to the cross-sectional surface of the coil side, whereas the length of the cooling channels is equal to the width of the coil side.

With the rotor of the above-mentioned type there is no difficulty to obtain a sufficiently great pneumatic conductivity of the cooling channels extending through the coil sides, whereas, on the other hand, the pneumatic conductivity of the inlet and outlet channels provided in the slot wedges is relatively small, which means that the total cross-section of the latter is practically completely determining for the magnitude of the cooling gas flow that may possibly be pressed through the portions of the rotor winding surrounded by the winding slots.

With a rotor according to the invention, the intention is to provide a slot wedge device which fulfils all mechanical demands to the same extent as the corresponding known slot wedges, while at the same time its total channel cross-section is considerably greater than in conventional rotors of the corresponding type.

With the hitherto designed rotors of the above-mentioned type, the spacing bodies arranged in the winding slot, for fixing the conductur bundle, have involved certain restrictions when designing the channels of the wedge device. In the development of a rotor according to the invention, with a suitable embodiment of these fixing devices and thus of the distributing chambers, it has been possible to design the channels of the wedge device without being much obstructed by the above-mentioned restrictions, thus obtaining a considerable increase of the total channel cross-section of the wedge without any reduction of the ability of taking up the centrifugal forces acting on the coil side. Under otherwise equal conditions, in a slot wedge device according to the invention it is possible to attain a total channel cross-section which is about 33% larger than in corresponding conventionally designed slot wedge devices.

From pressure curves reproduced in the above-mentioned IEEE Transactions, it can be derived that a pressure drop along a tangential cooling channel at the bottom of the winding slot in the known rotor is only one-third of the corresponding pressure drop at the top of the slot, the innermost conductor of the coil side thus acquiring a temperature at maximum rotor current which is about 35° C. higher than the temperature of the outermost conductor. One further task of the invention is to reduce the above-mentioned pressure drop so that the temperature of the innermost conductor is not much higher than the temperature of the outermost conductor. By a suitable design of the fixing devices arranged in the winding slot, the above-mentioned difference in temperature in a rotor according to the invention has been reduced to about 9° C. A mathematical investigation carried out in conjunction with the development work has shown that the above-mentioned pressure drop does not vary linearly with the average cross-section of the gas passageway located between the coil side and the slot wall but follows a function including a plurality of exponential expressions. In the range in question an increase in the average cross-section of the gas passageway then results in an unexpectedly great reduction of the pressure drop along said gas passageway.

In the development of a rotor according to the invention, it was initially assumed that the channels of the slot wedge would substantially be located in the radial plane (partially axial direction would involve unnecessary extension of the channels), and that the axial projection of the inlet channels would cross the axial projection of the outlet channels in each winding slot, and, more as a hypothesis, that the fixing devices located in the slot would not involve any restrictions regarding the axial positions of the slot wedge channels. With these assumptions the conclusion was arrived at that the condition for maximum gas permeability of the slot wedge with a necessary mechanical strength of this is that the channels of the slot wedge are distributed completely evenly along the entire slot, as close to each other as possible, and in such a way that each inlet channel has two immediately adjacently located outlet channels, and vice versa (disregarding irregularities at the slot ends).

Starting from this conclusion it has been the aim during the development stage to construct the devices necessary for fixing the conductor bundles of the slot in such a way that the above-mentioned even distribution is upset to as small an extent as possible. In, for example, the rotor shown in the above Hungarian patent specification, the total axial dimension of all spacing bodies arranged between the slot wall and the conductor bundle, at each side of the conductor bundle, constitutes 50% of the length of the winding slot, which means that the axial distance between evenly distributed wedge channels positioned in radial planes would be much larger than in a hypothetical case where the spacing bodies do not influence the design of the wedge channels. The fact that the wedge channels are to a relatively great extent axially directed means, in addition, a considerable increase in their pneumatic resistance.

The invention is based on the principle of reducing the total axial extension of the spacing bodies located between the slot wall and the conductor bundle by considerably reducing the requirement of such spacing bodies, more particularly by using a channel-like fixing member in the bottom of the slot and by preventing a tangential displacement of the different conductors of the conductor bundle with respect to each other by means of a plurality of elongated locking members embedded into the conductor bundle.

The use of such locking members is known (e.g. from French patent specification No. 7833078) in connection with rotors in which a conductor bundle arranged in a winding slot is only cooled by means of an axially flowing coolant. As the axial cooling channels are defined between the slot walls and the conductor bundle, they would consequently be blocked if spacing bodies, of the same type as shown in the known publications mentioned in the introduction, were arranged in the slot. Since locking members, embedded in the conductor bundle, in a rotor having tangential cooling channels, have equally great blocking effect as two spacing members of the same axial dimension arranged opposite to each other and on one side each of the conductor bundle, it has so far not been found justified to introduce such locking members in rotors having tangentially extending cooling channels. On the contrary, there is a great deal that speaks against the introduction of embedded, radially directed locking members, for example the fact that these require accurately formed and accurately mutually related apertures in the conductors of the conductor bundle and, in addition, involve the removal of conductor material.

In a rotor according to the invention, however, it has been found that the above-stated disadvantages are easily compensated by the advantages gained by the fact that the total axial extension of the supporting members arranged at the radially outermost part of the slot, between slot walls and conductor bundle, is reduced, which in turn results in a slot wedge assembly having a relatively large total channel cross-section owing to a less restricted distribution of the wedge channels along the winding slot.

In the embodiment of the invention shown in the patent application the additional advantage is gained that the supporting members, arranged between the conductor bundle and the slot walls, only extend over a relatively small portion of the slot height. This fact, together with the small total axial extension of the spacing bodies, means that the pressure drop of the flow of cooling gas along the radial distance from the outlet openings of the inlet channels to the radially inner portion of the slot becomes considerably smaller than with the corresponding known rotors. As mentioned, this results in the temperature difference between the outermost and innermost turns of the conductor bundle becoming smaller than 50% of the corresponding temperature difference in known rotors of the same type.

It could be feared that by using embedded locking members as well as spacing bodies arranged between conductor bundle and slot wall, this could block the tangentially extending cooling flow to an impermissible extent. This is avoided by arranging the locking members substantially with the same axial positions as the spacing bodies.

As mentioned above, a maximum value of the total cross-section surface of the channels of the slot wedge device may be obtained if the channels are evenly distributed in axial direction along the entire winding slot. Such a completely even distribution is prevented in practice also by the fact that the slot wedge device usually consists of a plurality of, for example ten, partial wedges arranged one after another, which means that the distance between two mutually adjacently positioned inlet channels or outlet channels, which are each provided in one partial wedge, becomes larger than the corresponding distance between channels provided in one and the same partial wedge.

According to a further development of the invention, the length of the partial wedges is chosen in such a way that all or most of the spacing bodies arranged between the slot wall and the conductor bundle are approximately disposed in places where partial wedges make contact with each other. In this way, it is avoided that the division of the wedge device into a plurality of partial wedges will cause any further discontinuity in the axial distribution of the channels of the wedge. At the same time the advantage is obtained that the spacing bodies situated between the radially outer portion of the conductor bundle and the slot walls may be effectively fixed to the slot wedge in a manner which is very simple from the point of view of mounting.

BRIEF DESCRIPTION OF THE DRAWINGS

What characterises the invention will become clear from the appended claims. In the following the invention will be described with reference to the accompanying schematic drawings, of which

Further.

FIGS. 5 and 6 respectively show an axial and a radial view of a first embodiment of a double spacing member, intended to clasp a radially outer portion of a conductor bundle located in a rotor slot.

In a corresponding way, FIGS. 7 and 8 show a second embodiment of such a member.

FIG. 9 shows a partial, tangential view of a conductor bundle, located in the above-mentioned winding slot, the slot being provided with a radially inner fixing device.

FIG. 10 shows the coil ends of the rotor in partial axial section.

DESCRIPTION OF PREFERRED EMBODIMENT

Figure 1:
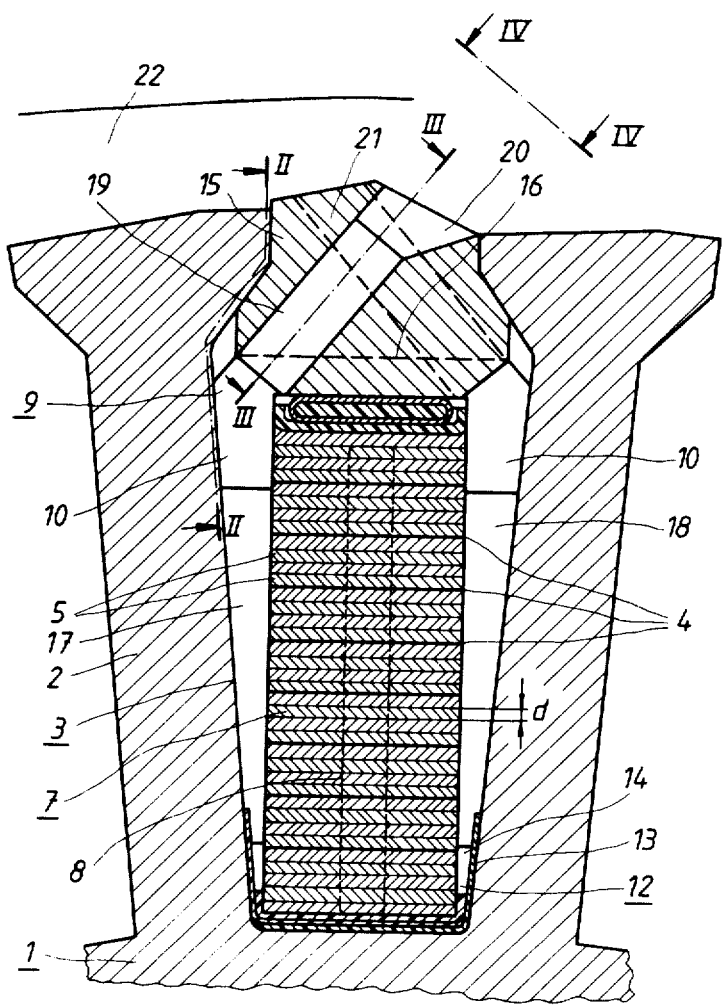
FIG. 1 shows a partial radial section through a rotor according to the invention along the line I—I of FIG. 2, FIG. 2 showing a partial view in tangential direction as indicated by the line II—II of FIG. 1.
Figure 2:
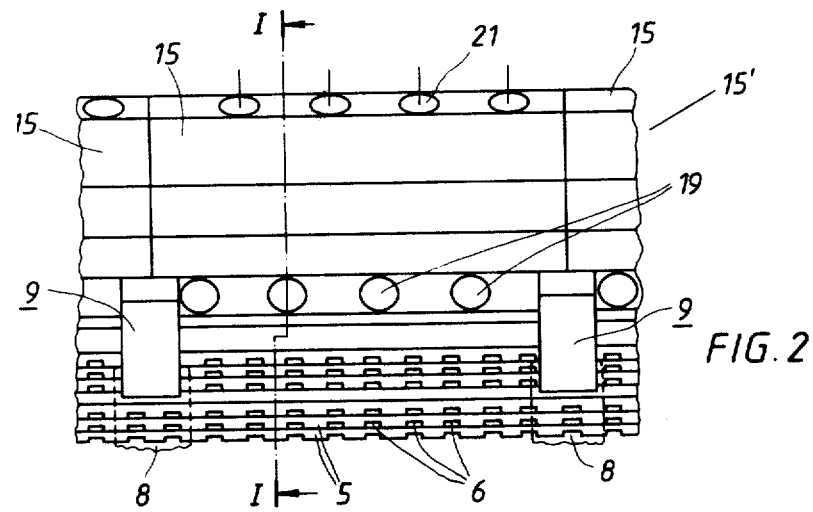
Figure 3:
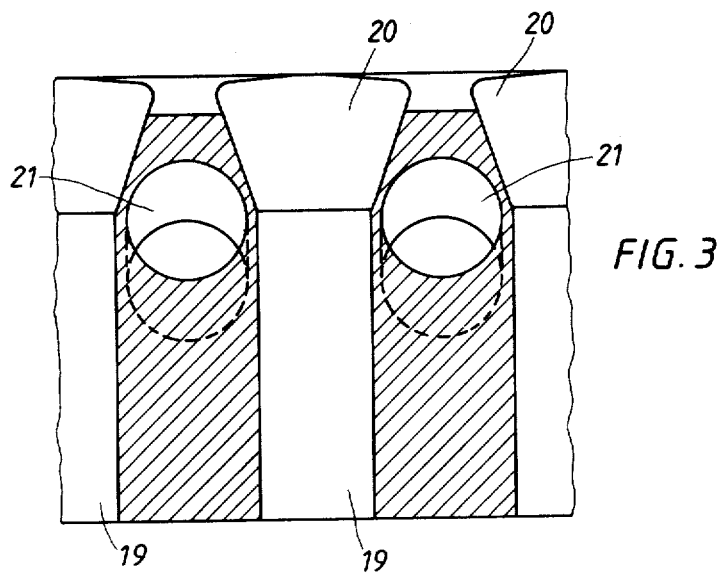
FIG. 3 shows a partial section through a slot wedge belonging to the above-mentioned rotor along the line III—III of FIG. 1.
Figure 4:
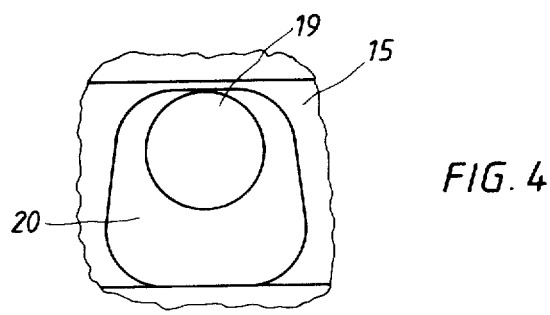
FIG. 4 shows the slot wedge in a partial view as indicated by the line IV—IV of FIG. 1.

In the drawings 1 designates a rotor for a turbo-generator. The rotor is provided with radially directed rotor teeth 2 and axially extending winding slots 3. The rotor supports a rotor winding which consists of a plurality of rotor coils, each coil being made with a plurality of turns which in the winding slot are insulated from each other by means of intermediate layers 4 of insulating material. Each turn contains a plurality of conductor bars 5, arranged close to each other, of a well-conducting material, for example copper. In each turn, each one of a plurality of conductor bars is provided with a plurality of substantially tangentially extending slots, so that a large number of substantially tangentially extending cooling channels 6 are formed in the conductor bundle 7 formed by the conductor bars 5. The conductor bars of the conductor bundle 7, with the exception of the radially outermost one, are provided with radially directed through-holes which are intended for a plurality of radially directed rods 8, which are insulated or made of insulating material and arranged axially one after another, said rods 8 running through the holes with no mentionable play, the conductor bars 5 thus being fixed with respect to each other.

At a radially outer portion, the conductor bundle 7 is fixed in tangential direction by means of a radially outer fixing device comprising a plurality of double, substantially U-shaped spacing devices 9 of insulating material which are disposed one after another in axial direction. Each of the devices 9 comprises two spacing bodies 10, which are connected to each other by means of a tangentially directed intermediate portion. Alternatively, a device 9' of this type may be used which is divided into two halves, which may be more or less displaced in relation to each other in axial direction. The axial dimension of the double spacing device 9, alternatively 9', is approximately the same as the corresponding dimension of the through-rod 8, and all or most of the devices 9 or 9' are preferably arranged in places where some of the cooling channels 6 are already blocked by a rod 8. In the case where the two separate halves of the double spacing device 9' are arranged with slightly different axial positions, a tangential slot is made for each half.

According to an embodiment not disclosed in the drawings, only one of the halves mentioned above is mounted at each joint between partial wedges, and alternately one by one at one side or the other of the conductor bundle.

At a radially inner portion, the conductor bundle 7 is fixed in tangential direction by means of a single bar 12 of U-shaped cross-section extending along the length of the entire winding slot and made of insulating material, or by several such bars which together extend along the whole winding slot or along a predominant part thereof. On each side of the conductor bundle 7, the bar 12 has a side portion which lies in an axial plane, constituting a spacing body positioned between the conductor bundle and a slot wall and making mechanical contact with a layer 13 of slot insulation located at the lowermost portion of the slot. Along a predominant portion of the length, the bar 12 has a radial dimension h which is less than four times the radial dimension d of the conductor bars 5. Preferably, h is smaller than twice d, and smaller than 15% of the radial extension of the conductor bundle. In addition, the bar 12 has a plurality of U-shaped portions 14, in which the maximum radial dimension H is relatively large. The U-shaped portions 14 have an axial extension which is approximately equally great as the axial extension of each of the rods 8. Each portion 14 is arranged in the vicinity of a rod 8 and in such a way that at least part of the projection of the rod 8 in the direction of the cooling channels 6 coincides with a corresponding projection of a U-shaped portion 14. Each of the portions 14 has a radial extension, H, which is smaller than the radial extension of the conductor bundle 7, preferably smaller than 50% thereof. The winding slot 3 is provided with a slot wedge device which consists of a plurality of mutually equal partial wedges 15, which are arranged immediately one after another in the axial direction. The slot wedge device is provided with a plurality of tangentially extending slots 16, in which the above-mentioned spacing members 9 are arranged with no mentionable axial play. Each of the slots 16 is arranged at the ends of two immediately consecutively positioned partial wedges 15 and has at least one delimiting surface in one wedge and at least one delimiting surface in the other wedge.

The pitch between the double spacing members 9 (or 9') is equal to the length of the partial wedge 15, or a multiple thereof.

A radially inner portion of the winding slot is provided with slot insulation 13 since the tangential extension of the spacing bodies 14 is so small that there would otherwise be a risk of a spark-over to earth caused by creeping currents. The spacing bodies 9 or 9', on the other hand, may be arranged in immediate mechanical contact with the rotor iron, which results in the advantage that the maximally permitted pressure exerted by a spacing body 9 or 9' against the slot wall acquires a considerably higher value than with corresponding spacing bodies of the above-described known machines, in which this pressure must not exceed that which the slot insulation can endure.

The conductor bundle 7 is clamped in radial direction by means of one or a plurality of hollow pressure bars of soft copper arranged one after another between the slot wedge and the conductor bundle. Each pressure bar is sealed at the ends and has been supplied with liquid epoxy resin which has been allowed to solidify under a pressure of at least 100 atmospheres. The tangentially extending slot 16 and the portion of the spacing member 9, positioned in said slot, may be constructed with relatively large tolerances with regard to radial dimensions since the pressure bar easily adjusts itself to the adjoining surfaces.

At each end, the winding slot 3 is sealed by means of two end wedges (not shown on the drawing) of insulating material, which are driven in in axial direction on one side each of the conductor bundle. The axial extension of the end wedges is approximately three times the axial extension of each of the spacing members 9. Together with one slot wall and one side of the conductor bundle 7 two end wedges define an inlet chamber-17 for cooling gas. In a corresponding manner, an outlet chamber 18 is defined on the other side of the conductor bundle. The inlet chamber 17 is connected to all the inlet channels 19 opening out at the rotor periphery, four such channels being provided in each of the mutually equal partial wedges 15. These channels are positioned immediately one after another in the length of the entire rotor slot. Along a predominant portion of the channel length, each inlet channel 19 is circular cylindrical. The channel is formed with an inlet portion 20, the opening of which is largely tangentially directed and in such a way that the tangential direction component coincides with the rotating direction of the rotor. The side surfaces of the inlet portion 20 substantially correspond to the side surfaces of a truncated pyramid having four corner portions. The corner portions are rounded with a radius of curvatuve which, for manufacturing reasons, is chosen to be equal to the radius of the above-mentioned circular cylindrical channel portion. Alternatively, the inlet portion 20 may have side surfaces which correspond to a truncated cone.

In each partial wedge 15 there are also provided four outlet channels 21 in such a way that the projections thereof in a radial plane cross the corresponding projections of the inlet channels 19. All the outlet channels 21 are arranged to conduct cooling gas from the outlet chamber 18 and out into the air gap 22 between the rotor 1 and a stator surrounding the rotor.

Apart from slight irregularities at the slot ends, that is, along at least 80% of the total length of the slot wedge, the channels according to the invention are arranged in such a way in axial direction that each inlet channel lies between two outlet channels and vice versa. The inlet openings of the inlet channels are almost evenly distributed along the slot wedge. The shortest distance between adjacent inlet channels is constant with the exception of the distance between adjacent inlet channels which belong to different partial wedges 15. The latter distance is, however, smaller than 300%, usually smaller than 200%, of the distance between mutually adjacent inlet channels located in one and the same partial wedge. The corresponding relationships apply to the outlet channels of the slot wedge. In the wedge device shown in the drawing the distance between mutually adjacent inlet channels, which belong to different partial wedges, constitutes 25% of the length of the partial wedge. In a rotor according to the invention, this distance normally constitutes less than 26% of the length of the partial wedge, that is, the sum of all such distances along the winding slot is preferably less than 26% of the length of the slot. A low percentage for the above sum means that the optimum, completely even distribution of the wedge channels along the entire winding slot is disturbed only to a minor extent by the spacing bodies located at the radially outermost part of the slot. In a rotor according to the invention, it is possible to attain a value of the above-mentioned sum which is as low as 15%.

In the rotor shown in the drawings, the partial wedge, that is, each portion of the slot wedge assembly lying between two mutually adjacent spacing devices 9, contains four inlet channels 19 and four outlet channels 21. Even if there were instead only three inlet channels and three outlet channels along this portion, a rotor according to the invention would have considerably better properties than a corresponding rotor of a conventional design. In a rotor according to the invention, several wedge assembly portions, each corresponding to the distance between immediately consecutively disposed spacing devices, are each furnished with at least three, preferably at least five, inlet channels and with at least three, preferably at least five, outlet channels.

The rotor shown in the drawing has only one inlet chamber and one outlet chamber in each slot. The invention also comprises a rotor in which each slot includes a plurality of inlet chambers and a plurality of outlet chambers, although such a rotor is considered to be less advantageous than that described here. At all times, the slot wedge device of a rotor according to the invention shall have, on an average, more than three channels per chamber.

Similarly to known rotors of the same type, the rotor described here is provided with two shrunk-on winding capsules. Each winding capsule covers an adjoining portion of each slot wedge. Since the inlet and outlet chambers of the rotor have a relatively great axial extension, however, there is no risk that a slot portion surrounded by a winding capsule will be cut off from the cooling gas supplied by means of wedge channels, so special connections between the cooling system of the coil ends and such slot portions can be dispensed with.

The inlet and outlet channels of the wedge assembly are arranged according to the principle that the longitudinal axes of such channels shall be parallel to one and the same plane, which is one step in the direction of a slot wedge assembly having minimum resistance to the flow of cooling gas. One further step towards this goal is taken when the plane in question is a radial plane, which is the case with the rotor described in connection with the drawings, or a plane which is substantially parallel to a radial plane. Additional conditions which are fulfilled by the shown rotor are that the inlet channels shall be substantially evenly distributed along the length of the entire slot wedge and that the outlet channels shall be evenly distributed among the gaps located between the inlet channels, whereas the axial minimum distance between an inlet channel and an adjoining outlet channel in each partial wedge is as small as possible, always smaller than 20% of the smallest diameter of the inlet channel, or smaller than 5 mm. The inlet channels 19 and the outlet channels 21 are made with substantially circular cross-section along a predominant part of the channel length.

The slot wedge in a rotor according to the invention may also be constructed with channels in which the channel cross-section is oblong in an axial direction. However, such a design results in a considerable increase in the manufacturing cost of the wedge assembly and, at sufficient mechanical strength, provides a relatively high pressure drop for the coolant. In the rotor shown in the drawings, the channel cross-section of the circular cylindrical portion of the inlet channels 19 is approximately equal to the channel cross-section of the outlet channels 21, the number of outlet channels being equal to or approximately equal to the number of inlet channels. Alternatively, in each winding slot in a rotor according to the invention, the total cross-sectional area of the outlet channels may be made somewhat smaller than the total cross-sectional area of the inlet channels, since the pressure drop over the outlet channels is usually smaller than one-seventh of the pressure drop over the inlet channels. However, since the increase of the mechanical strength of the wedge that this would lead to only manifests itself on one side of the wedge, making the total cross-section area of the outlet channels smaller than the total cross-section area of the inlet channels would hardly result in any advantage.

When dimensioning the inlet channels of a rotor according to the invention, one condition for a slot wedge which is advantageous from the point of view of strength is that the shortest axial distance between the circular cylindrical portions of two mutually adjoining inlet channels in each partial wedge shall be larger than 90% of the diameter of these portions. (In case of a minor deviation from circular shape, the diameter shall be measured in a radial plane.) At the same time, it is important that the above-mentioned diameter is as large as possible in order to achieve a great pneumatic conductivity. However, the diameter must be limited to such an extent that the thickness of all the wedge portions located between an inlet channel and a rotor tooth and making contact with the rotor tooth is greater than 5%, preferably greater than 8% of the maximum radial dimension of the slot wedge.

The air gap 22 is supplied with cooling gas at the rotor ends. From the air gap the cooling gas flows through axial cooling channels in the stator.

In FIG. 10 the path of the cooling gas through the coil ends of the rotor in indicated by arrows. The coil ends are arranged between two sleeves 23 and 24 of insulating material, inlet openings for cooling gas being provided in screen 23 and outlet openings in screen 24. The cooling gas flows through cooling channels 6', which are transversely directed with respect to the conductors of the coil ends and provided therein.

I claim:

1. A gas cooled rotor for a turbo-generator, said rotor including a plurality of winding slots comprising:
   a rotor winding containing a conductor bundle partially disposed in said winding slots, said conductor bundle being traversed by a plurality of substantially tangentially directed cooling channels;
   a slot wedge for retaining said conductor bundle in said slots, said slot wedge including a plurality of at least three inlet channels, and outlet channels for a cooling gas, said inlet channels communicating with said cooling channels at one side of said conductor bundle and having an opening at the rotor periphery in a direction of rotation for the rotor, said outlet channels communicating with said cooling channels at the other side of said conductor bundle and being evenly distributed among wedge portions located between said inlet channels, said inlet channels having projections in a radial plane crossing corresponding projections of said outlet channels;
   a radially outer electrical insulating spacing member, including a plurality of first spacing bodies between a first wall of said slot and said conductor bundle having first axial interspaces therebetween, each being connected to at least three of said inlet channels, and a plurality of second spacing bodies between a second wall of said slot and said conductor bundle having second axial interspaces in between, each of said second axial interspaces being connected to at least three of said outlet channels;
   a radially inner electrically insulating spacing member means comprising at least one bar having a substantially U-shaped cross-section for clasping a radial inner portion of said conductor bundle; said outer spacing member and inner spacing member means retain said conductor bundle in a tangential direction with said inner spacing means abutting said walls and
   a plurality of locking members for locking a number of conductors in said conductor bundle to each other.

2. A gas cooled rotor according to claim 11, wherein said bar of substantially U-shaped cross-section comprises a plurality of first bar portions of relatively small axial extension, separated by a plurality of second bar portions of a relatively axial extension, the radial extension of said first portions being smaller than the radial dimension of the conductor bundle and greater than the radial extension of said second portions, the second portions radial extension being smaller than 15% of the radial extension of the conductor bundle, a plurality of said first bar portions being each in the vicinity of a corresponding locking member, the projection of each locking member in the direction of said cooling channels overlapping a corresponding projection of said first bar portion.

3. A gas cooled rotor according to claim 1, wherein a hydraulic pressure member in the form of a metallic pressure bar, which is filled with a solidified pressure medium, is located radially inside a plurality of partial wedges and in pressure-transmitting contact therewith and with a radially inward-facing surface of at least one of said double spacing device.

4. A gas cooled rotor according to claim 1, wherein the two spaces of the winding slot, which are defined between said conductor bundle and a said first and said second slot wall, respectively, are blocked in axial directions in at least two places so that at least one inlet chamber for cooling gas is formed between the conductor bundle and said first slot wall, and at least one outlet chamber for cooling gas is formed between the conductor and said second slot wall, said at least one inlet chamber being arranged in direct communication with at least three of said inlet channels, and said at least one outlet chamber being arranged in direct communication with at least three of said outlet channels.

5. Gas-cooled rotor according to claim 1, wherein the two spaces of the winding slot, which are defined between said conductor bundle (7) and a said first and said second slot wall, respectively, are blocked in axial directions in at least two places so that at least one inlet chamber (17) for cooling gas is formed between the conductor bundle and said first slot wall, whereas at least one outlet chamber (18) for cooling gas is formed between the conductor bundle (7) and said second slot wall, said at least one inlet chamber (17) being arranged in direct communication with at least three of said inlet channels (19), and said at least one outlet chamber (18) being arranged in direct communication with at least three of said outlet channels (21).

6. A gas cooled rotor according to claim 5, wherein each winding slot has only one inlet chamber and only one outlet chamber, the inlet chamber being connected to all the inlet channels of said slot wedge, and the outlet chamber being connected to all the outlet channels of said slot wedge.

7. A gas cooled rotor according to claim 1, wherein each of said inlet channels and each of said outlet channels, along a predominant portion of the channel length, has a circular cylindrical cross-section, and each of said inlet channels is formed with an inlet portion, the delimiting surfaces of which substantially correspond to the side surfaces of a truncated cone.

8. A gas cooled rotor according to claim 7, wherein the side surfaces of said inlet portion substantially correspond to the side surfaces of a truncated pyramid with four corner portions, said corner portions being rounded.

9. A gas cooled rotor according to claim 8, wherein said corner portions have a radius of curvature which is equal to the radius of said circular cylindrical cross-section.

10. A gas cooled rotor according to claim 11, wherein said slot wedge comprises a plurality of partial wedges arranged immediately one after another and said first spacing bodies and said second spacing bodies are included in a plurality of double spacing devices, each of said double spacing devices comprising one of said first spacing bodies, and one of said second spacing bodies connected by at least one tangentially extending spacing device portion, said spacing devices being arranged one after the other between said slot wedge and said conductor bundle in such a way that a plurality of said tangentially extending spacing device portions are located in a plurality of tangentially extending radially inwardly-directed slots which are formed in said slot wedge, each of said tangentially extending slots being defined with the aid of at least one surface belonging to one and at least one surface belonging to the other of two partial wedges arranged immediately one after another.

* * * * *